UNITED STATES PATENT OFFICE 1,952,119

REFRACTORY CEMENT

George F. Comstock, Niagara Falls, N. Y., assignor to The Titanium Alloy Manufacturing Company, New York, N. Y., a corporation of Maine No Drawing. Application April 21, 1931, Serial No. 531,855

2 Claims. (Cl. 106—8)

My invention relates generally to cements used as binders in forming refractory shapes, and is especially aimed to produce a new and useful refractory cement having properties and advantages not found in those now in use.

My invention comprises a new formula for a refractory cement, of low shrinkage, great strength at all temperatures up to 2900° F. and good resistance to slags.

Magnesite is known to have excellent resistance to attack by slags at high temperature, but cements made from it suffer from cracking on account of its high shrinkage. This shrinkage may be largely overcome by mixing zircon with the magnesite in proper proportions. For instance, as was shown by Rees and Chesters (Trans. Ceramic Soc., London, vol. 29, No. 5, P. 309, May 1930), mixtures of zircon, magnesite, and ball clay may be so proportioned that after firing to about 2550° F., the permanent volume change amounts to any value between the limits of 10% shrinkage or 4% expansion, depending on the amount of zircon in the mixture.

From my experiments I have discovered that other things being equal, the expansion of the mixtures containing around 40% zircon tends to be increased by the addition of electrically-fused magnesia, finely ground, and granular refined zircon; while the shrinkage tends to be increased by the addition of finely-ground zircon and calcined or dead-burned magnesite.

If too much zircon is added the slag resistance is impaired, while with too much magnesite, shrinkage and cracking are experienced at high temperatures. I have also found that a better cement is made by omitting all clay in the mixture, and using sodium silicate solution of about 1.3 specific gravity as a binder. The formula which I have arrived at as giving the best strength at all temperatures up to 2900° F. and the most constant volume resulting in the least tendency to crack in drying or firing, is as follows:—

|  | Parts by weight |
|---|---|
| Calcined or dead-burned magnesite through 100 mesh | 50 |
| Electrically fused magnesia through 200 mesh | 15 |
| Refined zircon sand, through 60 mesh | 25 |
| Refined zircon milled through 300 mesh | 10 |
|  | 100 |

I moisten this charge with sodium silicate solution in water to sp. gr. 1.3, using as much solution as required to give the consistency desired for ease of application.

The proportions noted may be varied 5 to 10% without seriously impairing the usefulness of the cement, or sacrificing the chief advantages derived from its use.

I claim as my invention:—

1. A refractory, slag-resistant cement containing substantially by weight dead-burned, finely ground magnesite 50 parts; electrically fused, finely ground magnesia 15 parts; refined zircon sand (60 mesh) 25 parts; and refined zircon milled (300 mesh) 10 parts, bonded with sodium silicate solution of specific gravity of about 1.3, wherein magnesite shrinkage is counteracted by expansion of magnesia-zircon compounds formed when said cement is fired at temperatures up to 2900° F. to volatilize the binder and coalesce the particles thereof.

2. A refractory cement containing the following substances substantially in parts by weight: dead-burned, finely-ground magnesite 50 parts, electrically-fused, finely-ground magnesia 15 parts, refined zircon sand 25 parts, and refined zircon milled to pass through 300 mesh 10 parts, bonded with sodium silicate solution, wherein magnesite shrinkage is counteracted by expansion of magnesia-zircon compounds formed when said cement is fired at temperatures up to 2900° F. to volatilize the binder and coalesce the particles thereof.

GEORGE F. COMSTOCK.